US012583253B2

(12) United States Patent
Wendt et al.

(10) Patent No.: US 12,583,253 B2
(45) Date of Patent: Mar. 24, 2026

(54) WHEEL BEARING ASSEMBLY AND METHOD FOR DISASSEMBLY

(71) Applicant: AKTIEBOLAGET SKF, Gothenburg (SE)

(72) Inventors: Volker Wendt, Üchtelhausen/Zell (DE); Rico Dittmar, Schweinfurt (DE); Juergen Eyrich, Premich (DE)

(73) Assignee: AKTIEBOLAGET SKF, Gothenburg (SE)

( * ) Notice: Subject to any disclaimer, the term of this patent is extended or adjusted under 35 U.S.C. 154(b) by 403 days.

(21) Appl. No.: 18/012,381

(22) PCT Filed: Jun. 28, 2021

(86) PCT No.: PCT/EP2021/067608
§ 371 (c)(1),
(2) Date: Dec. 22, 2022

(87) PCT Pub. No.: WO2022/008272
PCT Pub. Date: Jan. 13, 2022

(65) Prior Publication Data
US 2023/0265881 A1      Aug. 24, 2023

(30) Foreign Application Priority Data

Jul. 10, 2020    (DE) ..................... 10 2020 208 673.7

(51) Int. Cl.
*B60B 27/00* (2006.01)
*F16C 19/38* (2006.01)
*F16C 35/06* (2006.01)

(52) U.S. Cl.
CPC ........ *B60B 27/0052* (2013.01); *B60B 27/001* (2013.01); *B60B 27/0015* (2013.01);
(Continued)

(58) Field of Classification Search
CPC ........... B60B 27/0052; B60B 27/0015; B60B 27/001

See application file for complete search history.

(56) References Cited

U.S. PATENT DOCUMENTS

2005/0173972 A1* 8/2005 De Freitas ............ F16C 35/067
                                                                   301/105.1
2007/0107233 A1   5/2007 Polei
                        (Continued)

FOREIGN PATENT DOCUMENTS

DE          19913024 A1   10/2000
DE          10241867 A1   3/2004
                        (Continued)

OTHER PUBLICATIONS

International Search Report and Written Opinion dispatched Jan. 13, 2022 for parent application No. PCT/EP2021/067608.
(Continued)

*Primary Examiner* — S. Joseph Morano
*Assistant Examiner* — Alex Palmer
(74) *Attorney, Agent, or Firm* — J-TEK LAW PLLC; Scott T. Wakeman; Mark A. Ussai

(57) ABSTRACT

A wheel bearing assembly includes at least two rolling-element bearings which participate together in a bearing assembly. At least one of the rolling-element bearings includes at least one bearing ring, which, for transmitting a propulsion, is attached to a drive shaft. At least one brake element of the wheel bearing assembly is immovable relative to the bearing ring and a connecting unit of the wheel bearing assembly connects the brake element to the bearing ring. By a removal of the connecting element from the bearing ring in which none of the rolling-element bearings need to be removed, even only partially, the brake element
(Continued)

is removable from the rolling-element bearings and is displaceable to any distance from the bearing ring.

16 Claims, 14 Drawing Sheets

(52) U.S. Cl.
CPC ............ *F16C 19/385* (2013.01); *F16C 35/06* (2013.01); *F16C 2326/02* (2013.01)

(56) References Cited

U.S. PATENT DOCUMENTS

| | | | |
|---|---|---|---|
| 2007/0147719 A1 | 6/2007 | Komori | |
| 2008/0304785 A1* | 12/2008 | Stephan | ................ B60B 35/121 |
| | | | 384/569 |
| 2012/0235463 A1* | 9/2012 | Dejean | ................. B60B 27/001 |
| | | | 301/6.8 |
| 2021/0129582 A1* | 5/2021 | Regan | ................ F16C 33/7896 |

FOREIGN PATENT DOCUMENTS

| | | |
|---|---|---|
| DE | 10246939 A1 | 5/2004 |
| WO | 9513198 A1 | 5/1995 |
| WO | 2022008272 A1 | 1/2022 |

OTHER PUBLICATIONS

Office Action and Search Report from the Chinese Patent Office dispatched Jul. 8, 2025 in related application No. 202180048306.2, and translation thereof.

* cited by examiner

WHEEL BEARING ASSEMBLY AND METHOD FOR DISASSEMBLY

CROSS-REFERENCE

This application is the U.S. National Stage of International Application No. PCT/EP2021/067608 filed on Jun. 28, 2021, which claims priority to German patent application no. 10 2020 208 673.7 filed on Jul. 10, 2020.

BACKGROUND OF THE INVENTION

The present invention relates to bearings, and more particularly to wheel bearing assemblies.

According to FIG. 1 a unit including a wheel bearing assembly is known, which includes a hub element 10 made of cast iron, wherein two tapered roller bearings 12, 14 are disposed. The outer rings of the tapered roller bearings are pressed-in. The inner rings of the tapered roller bearings are disposed on a hollow axle section (not shown). Using a drive shaft (not shown) that extends inside the axle section, torque is transmitted to the hub element with the help of a flange (not shown) of the drive shaft. A rim (not shown) and a brake disc element (not shown) are fixedly screwed to the hub element at a radially outer region 20. An inner diameter of the brake disc element is smaller than an outer diameter of the hub element.

Furthermore, in trailers and front axles of trucks, wheel bearings are known wherein the hub is embodied one-piece with the outer rings. Here the hub includes a flange that is an elevation on an otherwise essentially cylindrical-shell-shaped outer surface of the hub. The flange includes holes, using which a wheel adapter is normally attached, at which a rim is directly screwed onto the flange. In a completely assembled state, a brake disc element is installed in the environment of the inboard side of the wheel bearing. An inner diameter of the brake disc element is larger than a maximum outer diameter of the wheel bearing, so that during a disassembly the brake disc element can be moved over the wheel bearing.

SUMMARY OF THE INVENTION

The object of the invention consists in particular in providing a wheel bearing unit of the above-described type with a long service life. The object is inventively achieved by the features of patent claim 1, while advantageous designs and further developments of the invention can be extracted from the dependent claims.

The invention emanates from a wheel bearing assembly including at least two rolling-element bearings, which are configured to jointly participate in a bearing assembly of at least one wheel, wherein at least one of the rolling-element bearings includes at least one bearing ring, which, for transmitting a propulsion, is attached to a drive shaft, and wherein at least one brake element of the wheel bearing assembly is immovable relative to the bearing ring, wherein a connecting unit of the wheel bearing assembly connects the brake element to the bearing ring.

It is proposed that by a removal of the connecting element from the bearing ring, wherein none of the rolling-element bearings need to be removed, even only partially, the brake element is removable from the rolling-element bearings and is bringable to any distance from the bearing ring. A long service life of the wheel bearing assembly can thereby be achieved. In particular, it can be achieved that a removal of the rolling-element bearing can be omitted during a replacing of the brake elements, since the brake element can be removed radially outside of and over the rolling-element bearing, and a new brake element can be attached in an analogous manner, whereby the service-life-reducing errors during a removal and subsequent installation of the rolling-element bearing, and service-life-reducing dirt entry into the rolling-element bearing are securely precluded. The far-and-away largest share of such errors is caused by the failure to comply with installation requirements, for example, by the use of an unsuitable tool during an attaching of the inner rings of the rolling-element bearing by a nut, which is surprising.

The bearing ring is preferably an outer ring.

The brake element is advantageously configured as a brake disc element, whereby a particularly effective braking is achieved.

In particular, the connecting unit can include screws, whereby the brake element is directly screwed onto the bearing ring, wherein these screws can simultaneously in particular attach a rim or in particular an adapter to the bearing ring.

The drive shaft is preferably connected to the bearing ring with the aid of screws, which are screwed into recesses on a first end side of the bearing ring. Installation space can thereby be saved in the radial direction.

The brake element advantageously has a shorter distance from a second end side of the bearing ring opposite the first end side than from the first end side. A good installation space utilization can thereby be achieved.

Furthermore, it is proposed that the bearing ring is free on its radial outer side from shoulders and a flange, into which screws for attaching the drive shaft and/or a hub element of the wheel bearing assembly are screwed in. In this way the bearing ring is made more compact in the radial direction.

In addition, it is proposed that the wheel bearing assembly includes screws and/or studs by which at least one hub element is attached to the bearing ring. In this way a relatively low weight can be achieved. The brake element is preferably fixedly screwed onto the hub element, whereby a simple removal can be achieved.

The hub element is advantageously supported on the bearing ring over more than 30%, preferably over more than 50%, of its maximum axial length on its radial inner side. A particularly high rigidity can thereby be achieved.

Furthermore, it is proposed that the wheel bearing assembly includes a flange of the drive shaft, which flange is disposed at least partially in the axial direction of the wheel bearing assembly between an attachment region of the hub element, using which the hub element is attached to the bearing ring, and the bearing ring. The hub element can thereby be removed without the flange of the drive shaft having to be removed, which means a large reduction of effort.

The wheel bearing assembly preferably includes at least one positioning unit, which makes possible a positioning of a hub element relative to the bearing ring in a certain position with respect to a circumferential direction of the bearing ring. A simple and correct installation can thereby be achieved, wherein the individual fitting surfaces of the hub element and bearing ring come completely into abutment with each other.

In addition, it is proposed that the wheel bearing assembly includes at least one screw, which at least contributes to attaching the drive shaft to the bearing ring, and which is free from a region that penetrates the hub element. This makes it possible for an installer to recognize how the hub element is to be positioned in the circumferential direction relative to the bearing ring during an attaching of the hub element to the bearing ring, without angular rotation of the components occurring, which due to recesses on both components ensures the receiving of the full-surface force transmission and also helps with the prevention of rust.

The wheel bearing assembly advantageously includes at least one installation securing device, which, to achieve a maximally stable connection between a hub element of the wheel bearing assembly and the bearing ring, requires a certain orientation or one of a certain number of certain orientations of the hub element relative to the bearing ring in the circumferential direction, wherein the certain number is smaller than six. It can thereby be achieved that embodiments of the bearing ring extending outward in the radial direction, and embodiments of the hub element extending inward in the radial direction abut against one another, whereby a good force transmission is achieved between hub element and bearing ring.

In a completely uninstalled state, in which neither the brake element nor the flange is connected to any other component, a flange of the drive shaft is preferably fully movable through the through-hole of the brake element. The brake element can thereby be removed without removing the flange of the drive shaft from the bearing ring of the rolling-element bearing, whereby an effort for exchanging the brake element is significantly reduced.

Furthermore, it is proposed that the rolling-element bearings are tapered roller bearings, and tapered rollers of the two tapered-roller rows are differently sized. That tapered rollers are "differently sized" should be understood in particular to mean that the height of the tapered rollers and/or surface areas of the tapered rollers and/or base surfaces of the tapered rollers are different from one another. In this way a small extension of the rolling-element bearing in the radial direction can be achieved.

Inner rings of the rolling-element bearing are preferably disposed on a hollow axle section of the wheel bearing assembly. A compact design can thereby be achieved. In particular, it can be achieved that the drive shaft extends inside the axle section.

The wheel bearing assembly advantageously includes at least one seal element that shields a spatial region that is radially between the bearing ring and the brake element. Rust formation in a fitting region between bearing ring and hub element can thereby be effectively counteracted.

Furthermore, a device is proposed, in particular a truck, including a wheel bearing assembly according to the above description and a drive shaft. In particular, the wheel is part of the device.

In addition, a method is proposed for removing a brake element of a wheel bearing assembly, in particular of a wheel bearing assembly according to the above description, wherein the brake and an outer ring of the wheel bearing assembly move relative to each other, and the outer ring here reaches completely through a through-hole of the brake element. A long service life can thereby be achieved. In particular, it can be prevented that during a replacing of the brake element a removal and subsequent installation of the rolling-element bearing is necessary, during which errors can occur which in further operation negatively affect a service life of the rolling-element bearing.

Furthermore, a method is proposed for installing a component of a wheel bearing assembly, in particular a wheel bearing assembly as described above, wherein the component is attached to a bearing ring by screws, wherein with respect to its circumferential direction the component is brought into such an orientation with respect to the bearing ring that a number of screws, using which the component can be attached to the bearing ring, is greater than in other orientations of the component relative to the bearing ring with respect to the circumferential direction, in which the component is also screwable to the bearing ring. A long service life can thereby be achieved. In particular, it can be prevented that the component is attached by a suboptimal number of screws.

The component is preferably the hub element or the brake element.

Furthermore a kit is proposed for assembling a wheel bearing assembly, in particular a wheel bearing assembly as described above, which includes a hub element, a bearing ring, and a certain number of attachment elements, wherein after assembly, all parts of the kit are only installed if the hub element is oriented in a certain way or in one of a number of certain ways relative to the bearing ring with respect to a circumferential direction of the bearing ring, wherein the certain number is smaller than six. A long service life can thereby be achieved. In particular, an assembly can be improved with respect to the service life. Furthermore, in particular an optimal force transmission can be ensured.

BRIEF DESCRIPTION OF THE SEVERAL VIEWS OF THE DRAWINGS

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION OF THE INVENTION

Figure 1:
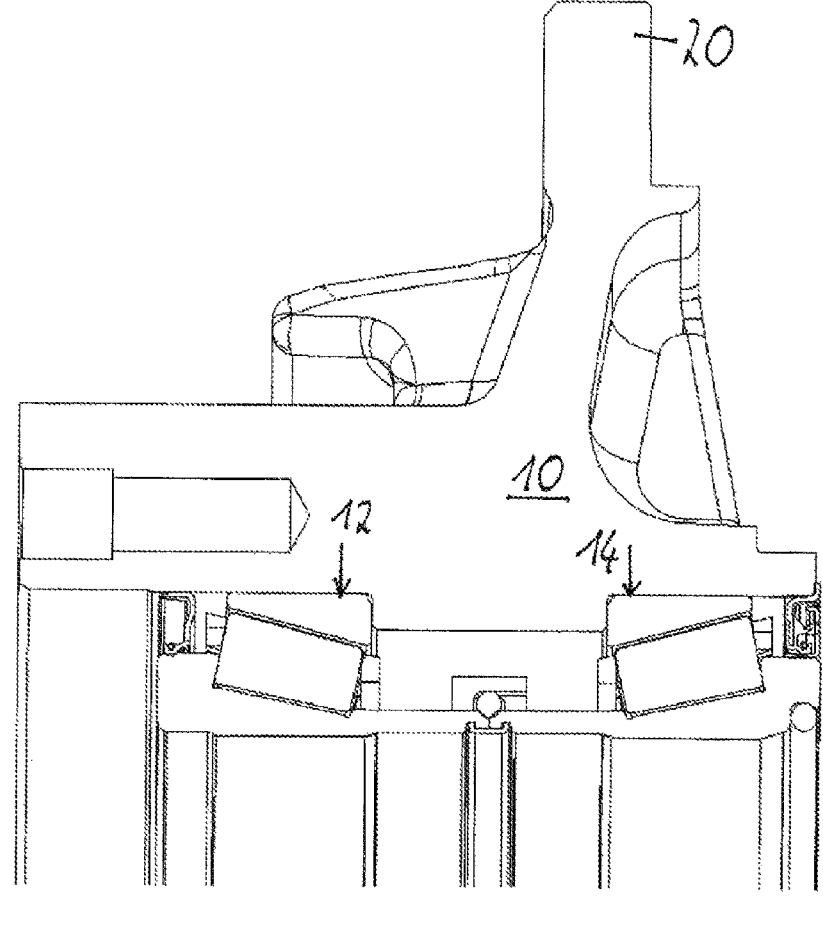
FIG. 1 shows a wheel bearing assembly according to the prior art.
Figure 2:
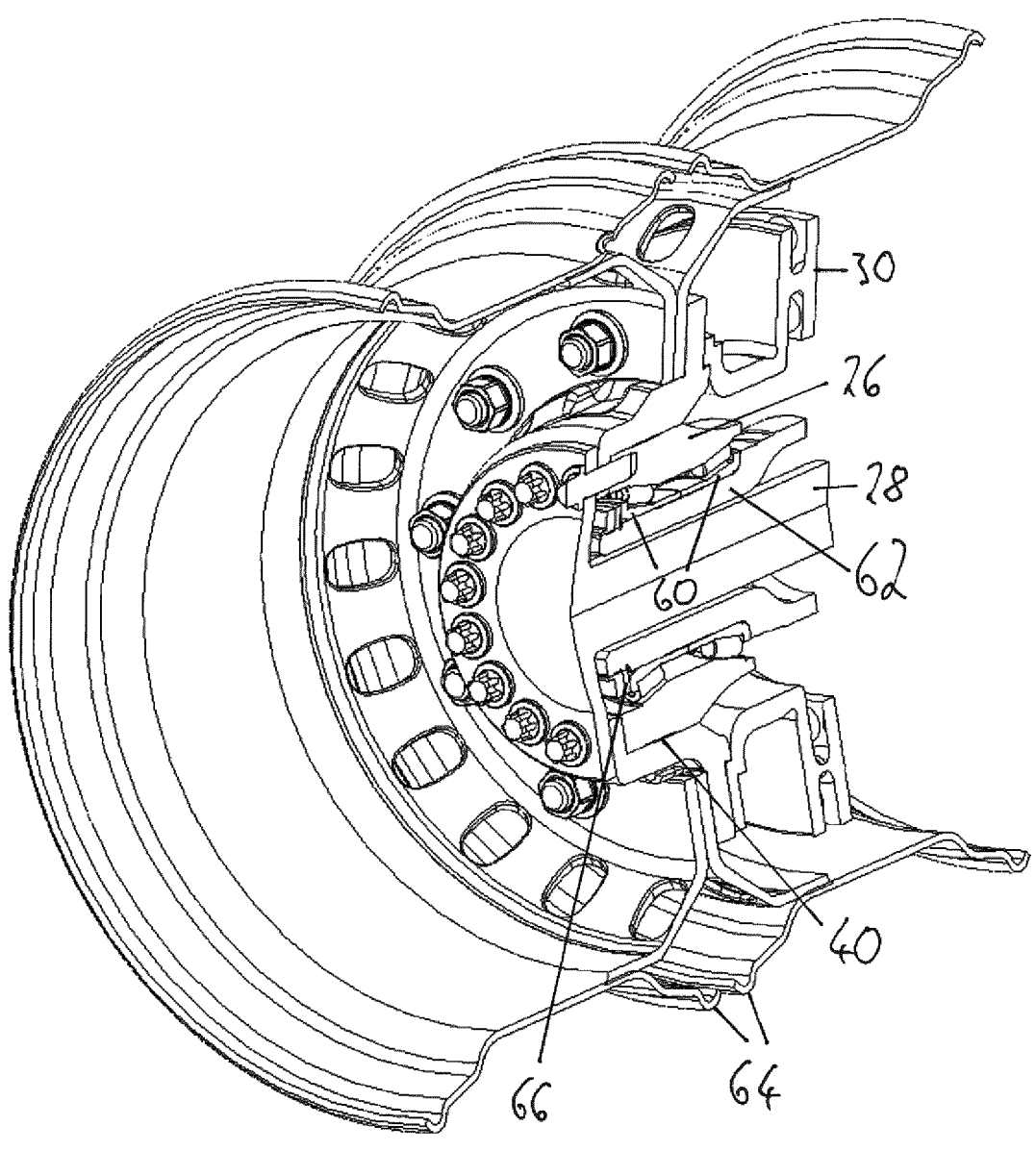
FIG. 2 shows a perspective view of a section through an inventive wheel bearing assembly.
Figure 3:
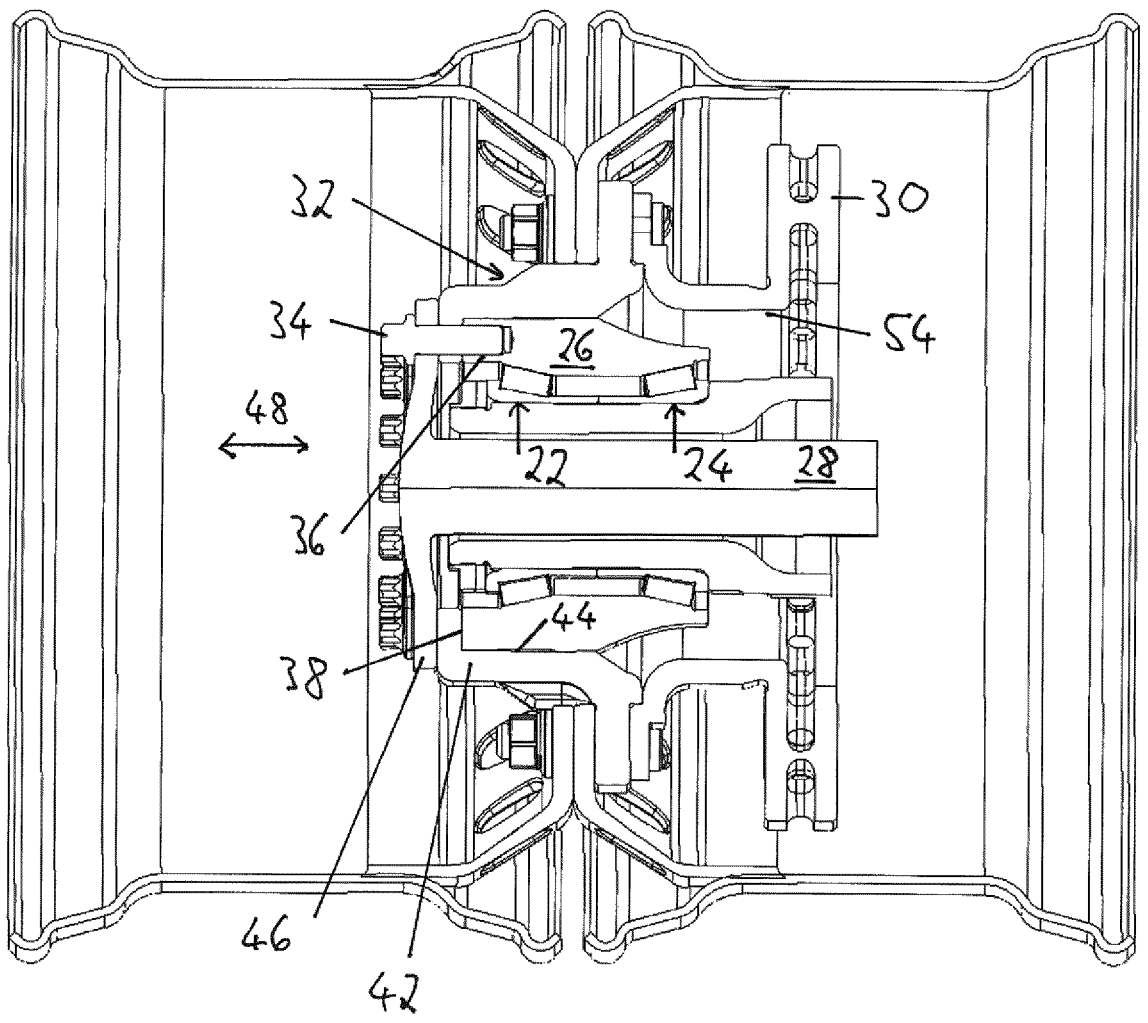
FIG. 3 shows an axial section through the wheel bearing assembly.

FIGS. 2 and 3 show an inventive wheel bearing assembly including two rolling-element bearings 22, 24 that are configured as a tapered roller bearings. The two rolling-element bearings rotatably support a rim 64 of the wheel bearing assembly relative to an axle section 62, which in a completely installed state is immovable relative to a body of a motor vehicle, which the wheel bearing assembly is part of in the state. The motor vehicle is configured as a truck. In the completely installed state, the rim is part of a wheel. The two rolling-element bearings have a common bearing ring 26, which is the outer ring for both rolling-element bearings. A drive shaft 28 extends through the axle section 62 and is attached to the bearing ring 26. A brake element 30 of the wheel bearing assembly, which brake element 30 is configured as a brake disc element, is rigidly attached to the bearing ring 26 by a connecting unit 32 of the wheel bearing assembly. The brake element is disposed on an inboard side of the wheel bearing assembly. The connecting unit 32 includes a hub element 42, screws 34, a flange 46 of the drive shaft, and further screws that attach the brake element 30 to the hub element. The screws 34 are screwed through the flange 46 and through openings of the hub element into openings 36 of the bearing ring 26. The flange 46 and the hub element 42 are thereby also attached to the bearing ring 26. The openings 36 are disposed on an end side 38 of the bearing ring. On its radial outer side 40 the bearing ring is free of shoulders into which screws are screwable for attaching the drive shaft or the hub element 42.

The flange 46 including the drive shaft and also the hub element 42 is removable from the bearing ring by loosening the screws 34. A central through-hole 54 of the brake element 30 is provided such that the bearing ring 26 is movable completely through it. For this reason, after loosening the screws 34 together with the flange 46 and the hub element 42, the brake element 30 is also completely removable and withdrawable from the rolling-element bearing and can be brought to any distance from the bearing ring 26. Loosening the screws 34 and removing the flange 46 and the hub element 42 from the bearing ring removes the connecting unit 32, wherein none of the rolling-element bearings need to be even partially removed. In a method for removing the brake element 30, the brake element is removed as described above from the bearing ring 26, wherein damage to the rolling-element bearing and dirt entry into the rolling-element bearing is reliably prevented. The bearing ring 26 is attached to the axle section 62 by rolling elements of the rolling-element bearing 22. Inner rings 60 of the rolling-element bearings 22, 24 are fixedly screwed onto an external thread of the axle section 62 by a nut 66. For fixedly screwing the nut, a torque of approximately 1000 to 1200 Nm is required, which is not achievable in a controlled manner for some small workshops.

On its radial outer side the bearing ring 26 includes a region that is configured cylindrical-shell-shaped. On its radial inner side 44 the hub element is supported on the bearing ring 26 over more than 50% of its maximum axial length. The surface region by which the hub element is supported is configured cylindrical-shell-shaped. On this surface region a paste can be applied that prevents so-called fretting, and corrosion generally.

In particular, the wheel bearing assembly can be configured such that it can carry a maximum load of 13 tons. A smallest inner diameter of the brake element can be, for example, 19.5 inches or 22.5 inches. The hub element is made of cast iron.

Alternative exemplary embodiments are depicted in FIGS. 4 to 13. Essentially identical components, features, and functions are generally numbered with the same reference numbers. However, to differentiate the exemplary embodiments the letters "a," "b," etc. are added to the reference numbers of the exemplary embodiments in FIGS. 4-13. The following description is essentially limited to the differences to the exemplary embodiment in FIGS. 2 and 3, wherein with respect to components, features, and functions remaining the same, reference can be made to the description of the exemplary embodiment in FIGS. 2 and 3.

Figure 4:
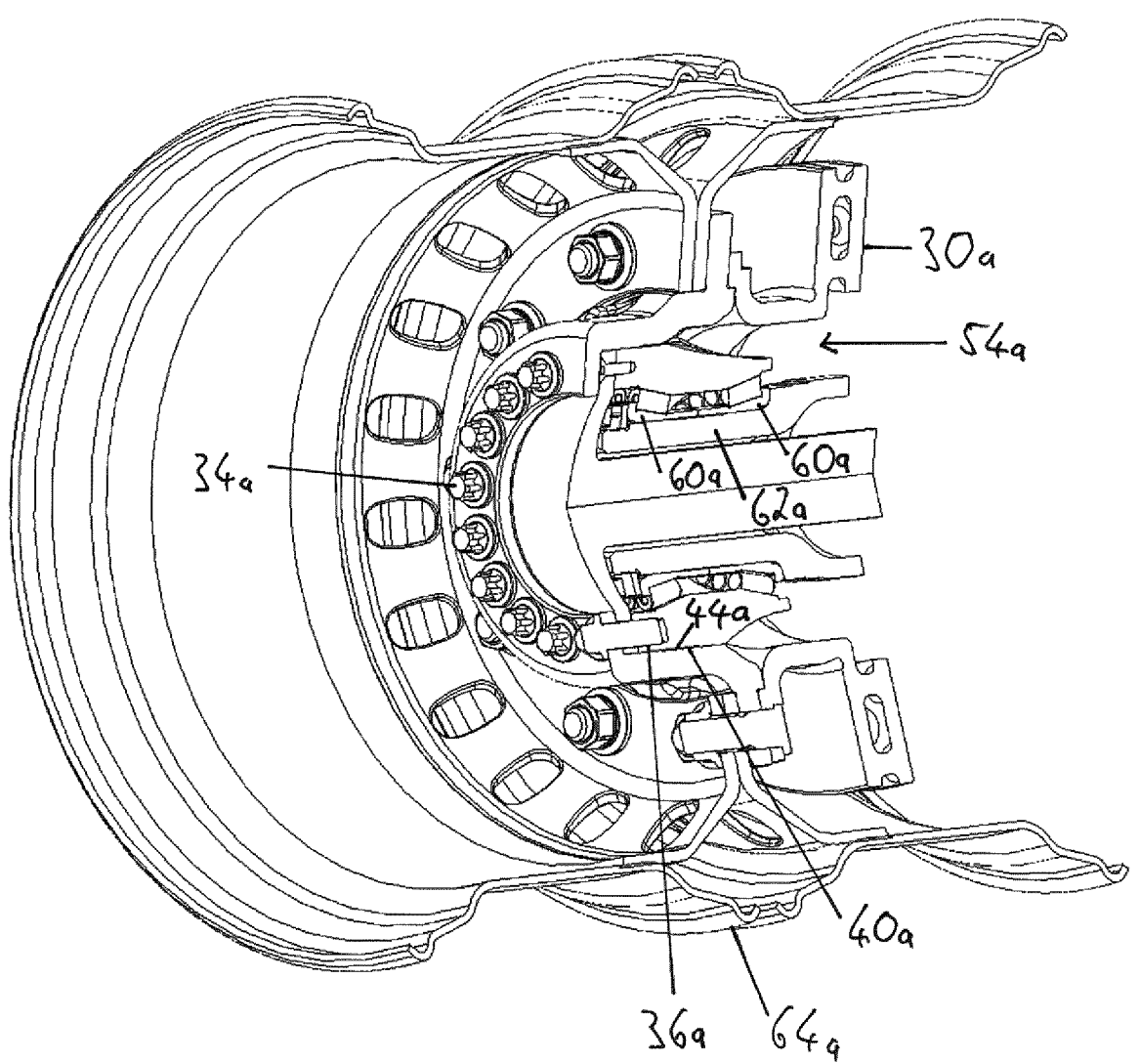
FIG. 4 shows a perspective view of a section of a further inventive wheel bearing assembly including a countersunk screw, which attaches the drive shaft to a rolling-element bearing of the wheel bearing assembly.
Figure 5:
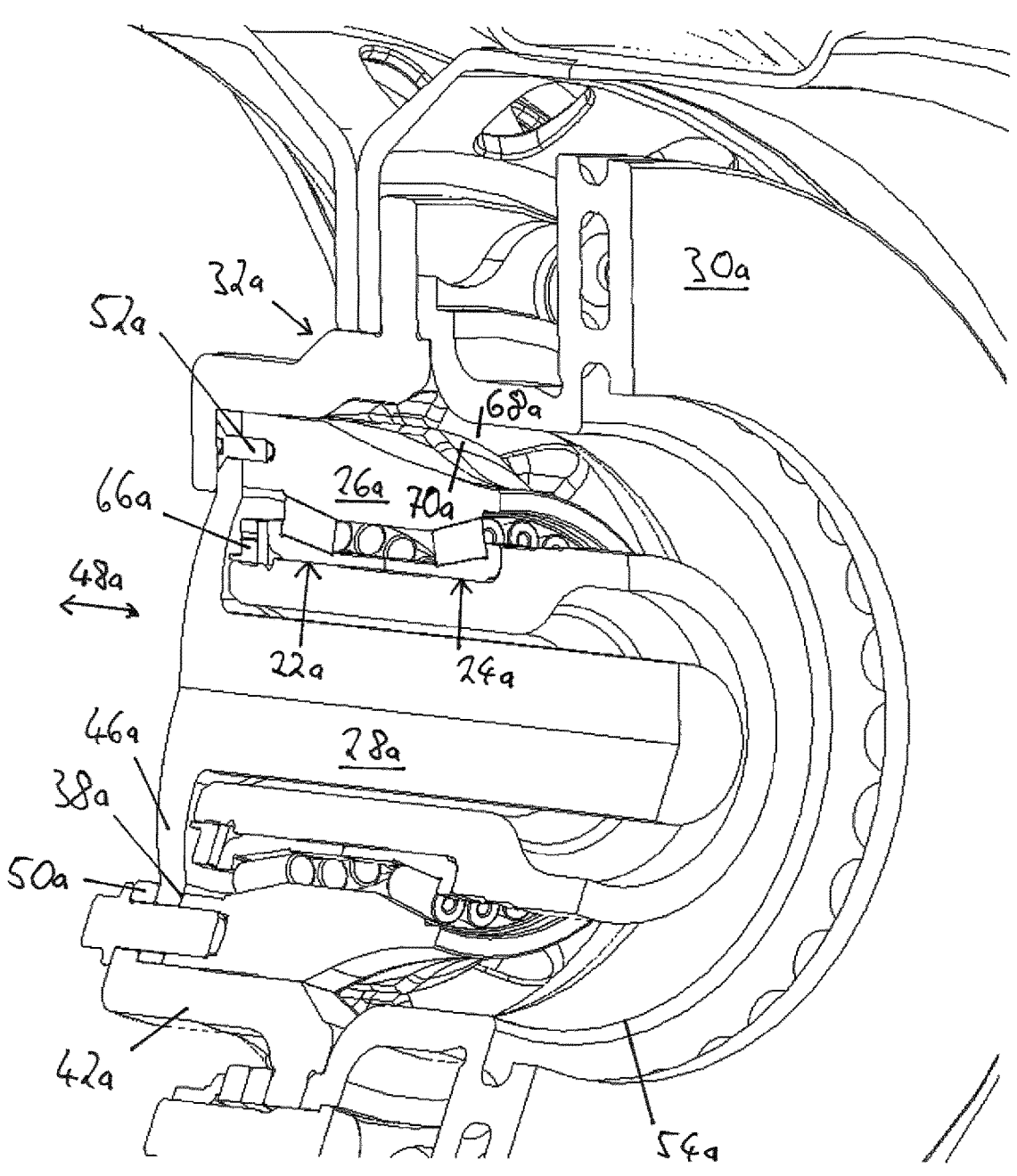
FIG. 5 shows an enlarged cutout of the last-mentioned section.

FIGS. 4 and 5 show an alternative exemplary embodiment of a wheel bearing assembly. With respect to an axial direction 48a of the wheel bearing assembly, a flange 46a of a drive shaft is disposed partially between an attachment region 50a of a hub element 42a and an end side 38a of the bearing ring 26a. Due to the attachment region 50a, the hub element is attached to the bearing ring using screws 34a. Here the screws also penetrate the flange 46a and fixedly clamp it to the end side 38a. After a loosening of the screws 34a, the hub element 42a together with the brake element 30a is completely withdrawable from the bearing ring 26a, wherein the flange 46a can thereby remain attached to the bearing ring 26a, since a central through-hole 54a of the brake element 30a is large enough that the bearing ring 26a and also the flange 46a are completely movable through it. For example, in a completely uninstalled state wherein neither the brake element nor the flange are connected to any other component, the flange 46a of the drive shaft is completely movable through a through-hole 54a. During the removal of the brake element 30a, the flange 46a is attached to the end side 38a of the bearing ring 26a by a screw 52a. The screw 52a is free of regions that penetrate the hub element. It preferably includes a countersunk head and thus does not protrude axially past the flange 46a. In one alternative design the desired orientation of the bearing ring and of the hub element relative to each other is achieved by the hub element and bearing ring including two screw holes, which have a certain spacing in the circumferential direction that no other screw holes of the hub element and of the bearing have from each other in the circumferential direction. The screw holes form an installation securing device.

Figure 12:
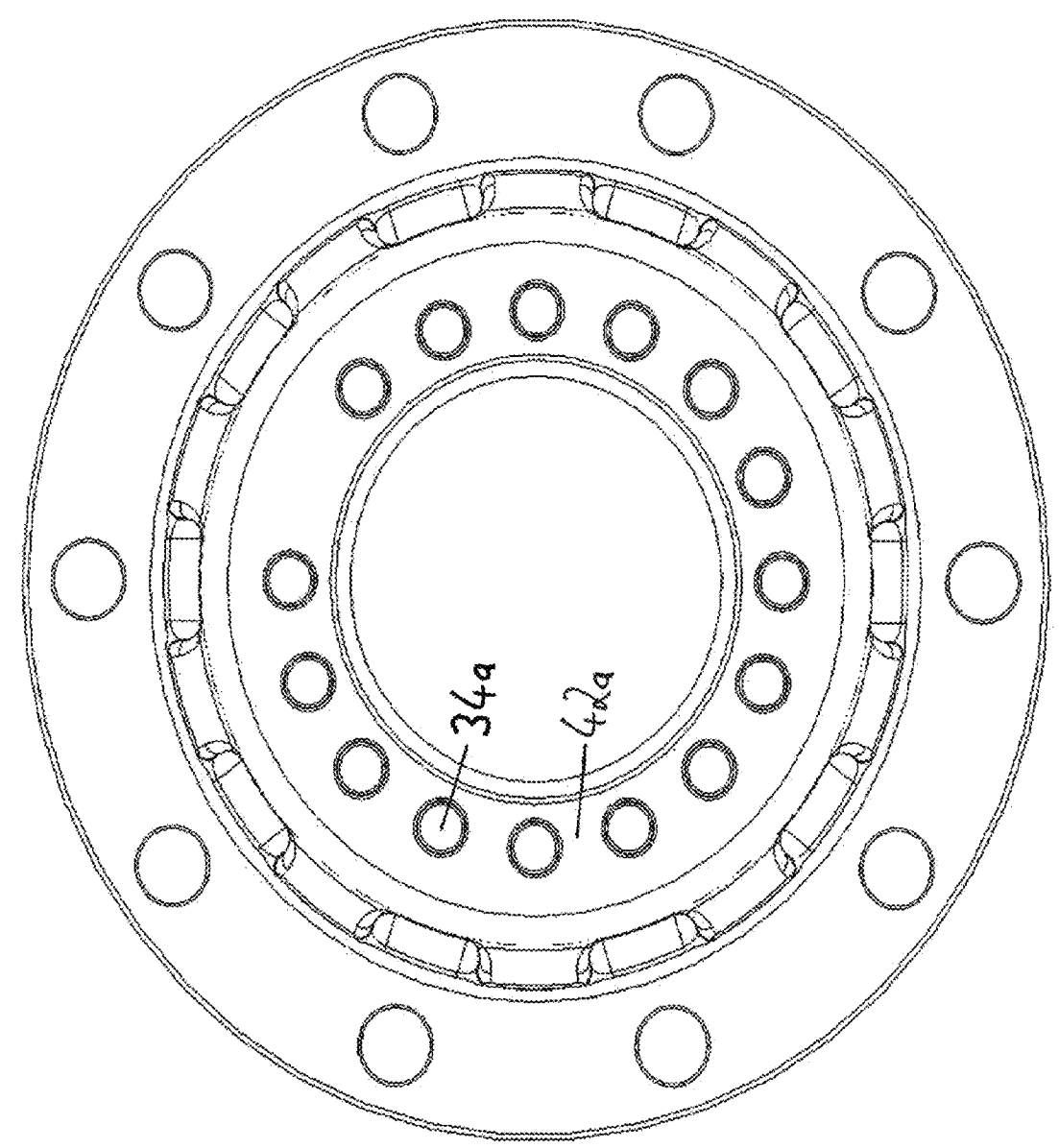
FIG. 12 shows a view of the hub element and of the bearing ring of the exemplary embodiment of FIGS. 4 and 5 in the axial direction starting from the outboard side.
Figure 13:
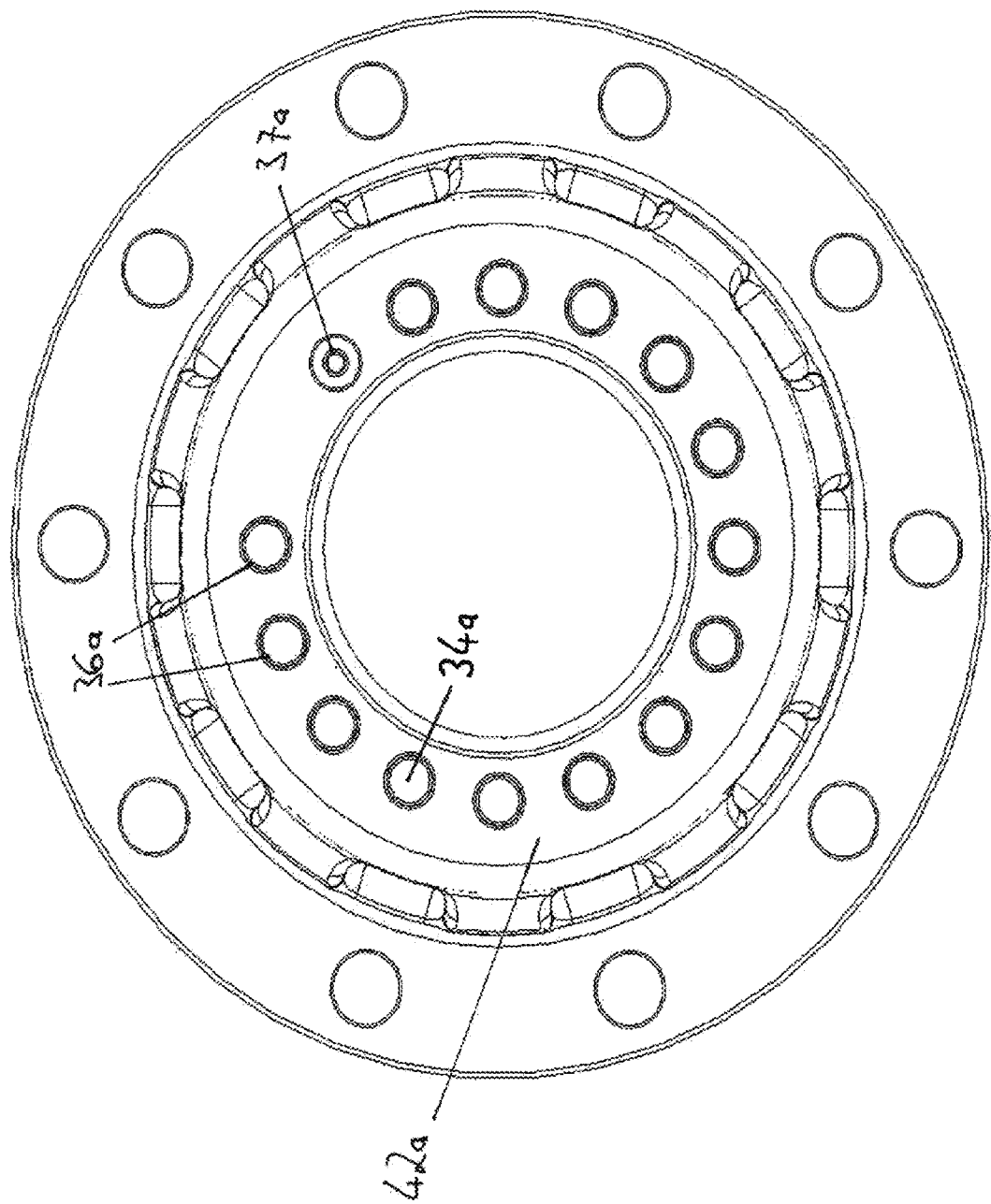
FIG. 13 shows a view of the hub element and of the bearing ring of the exemplary embodiment of FIGS. 4 and 5 in the axial direction starting from the outboard side.

After the removal of the brake element 30a and the installation of a new brake element onto the hub element 42a, the hub element is installed again on the flange 46a and the bearing ring 26a. Here the screw 52a has an important function, since it is disposed at a point at which in a completely installed state, there is a greater spacing in the circumferential direction between two screws 34 than at a point in the circumferential direction that is spaced from the screws 52a. Furthermore, an opening 37a, into which the screw 52a is screwed in the installed state, has a smaller diameter than the openings 36a, into which the screws 34a are screwed in the installed state (FIG. 13). There is thereby only a single orientation of the hub element and of the bearing ring 26a in the circumferential direction relative to each other, wherein the hub element and the bearing ring are screwable to each other such that a maximum possible number of screws 34a penetrate the hub element (FIG. 12).

Figure 10:
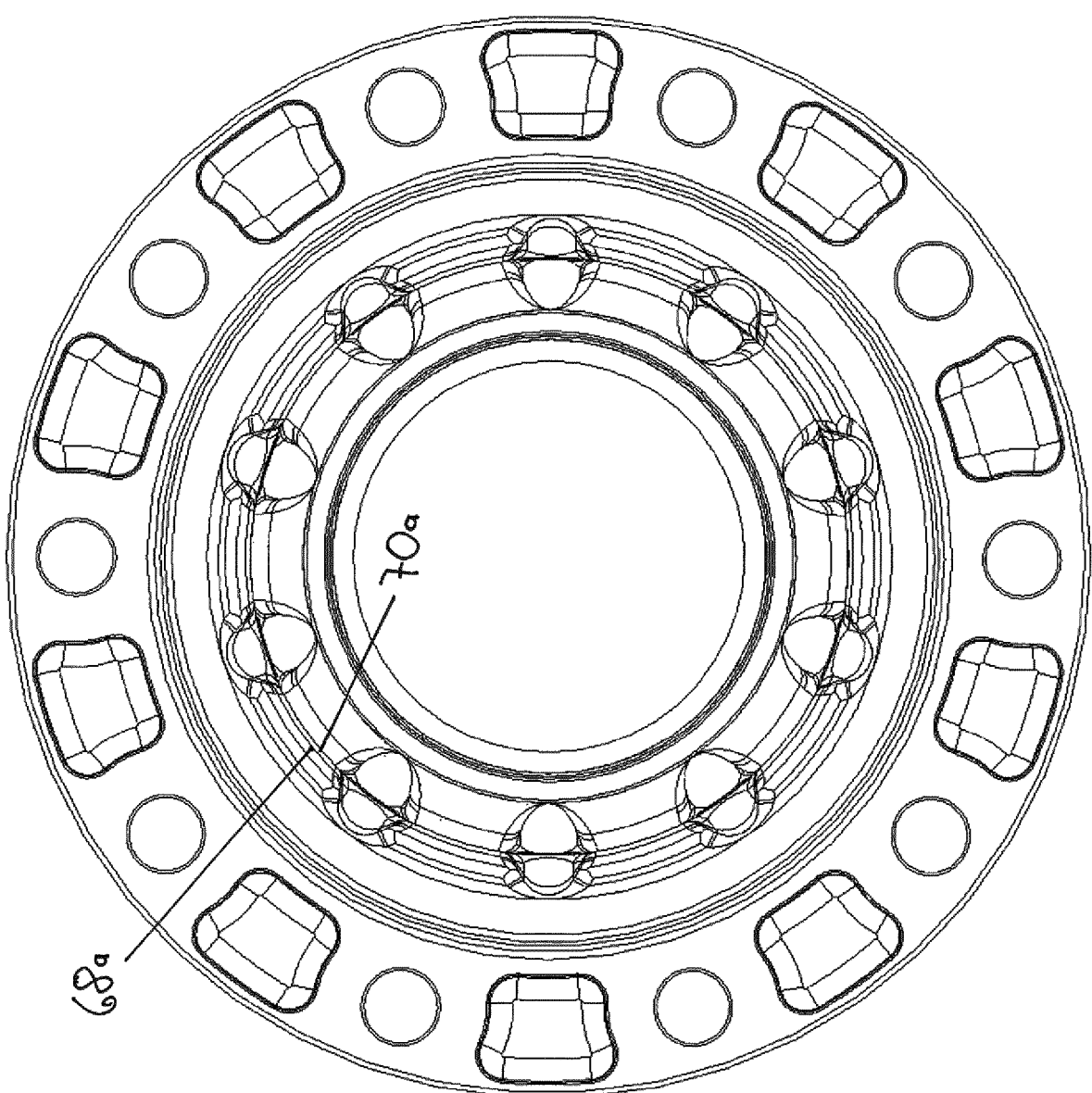
FIG. 10 shows a view of a hub element and of a bearing ring of the exemplary embodiment of FIGS. 4 and 5 in the axial direction starting from the inboard side.
Figure 11:
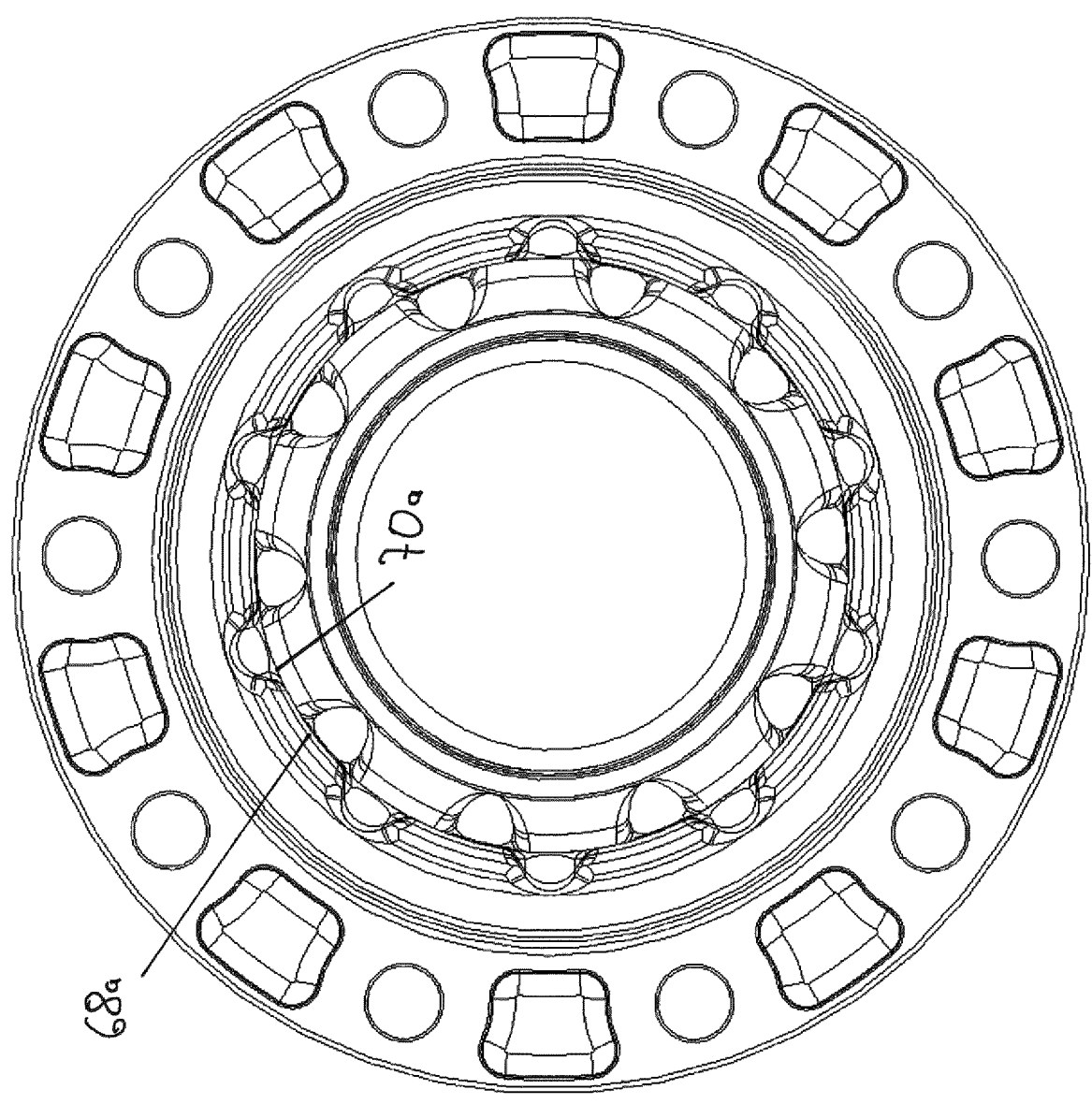
FIG. 11 shows a view of the hub element and of the bearing ring from FIG. 10 in the axial direction starting from the inboard side, wherein the hub element and the bearing ring are not attached to each other and are oriented differently with respect to each other than in FIG. 10.

The installation in the only possible orientation causes elevations 68a (FIG. 5) of the hub element, which extend radially inward, and elevations 70a of the bearing ring 26a, which extend radially outward, to abut against each other over a maximum possible surface region (FIG. 10). Contact surfaces between the hub element and the bearing ring for mutual force transmission are thereby maximized, and possibilities for rust formation are minimized. In other orientations of the bearing ring 26a and of the hub element 42a relative to each other, the respective contact surfaces are clearly smaller (FIG. 11).

In its uninstalled individual parts, the wheel bearing assembly forms a kit, after the assembly of which all parts of the kit can only be installed when the hub element 42a is oriented in the single orientation relative to the bearing ring 26a with respect to a circumferential direction of the bearing ring.

Figure 6:
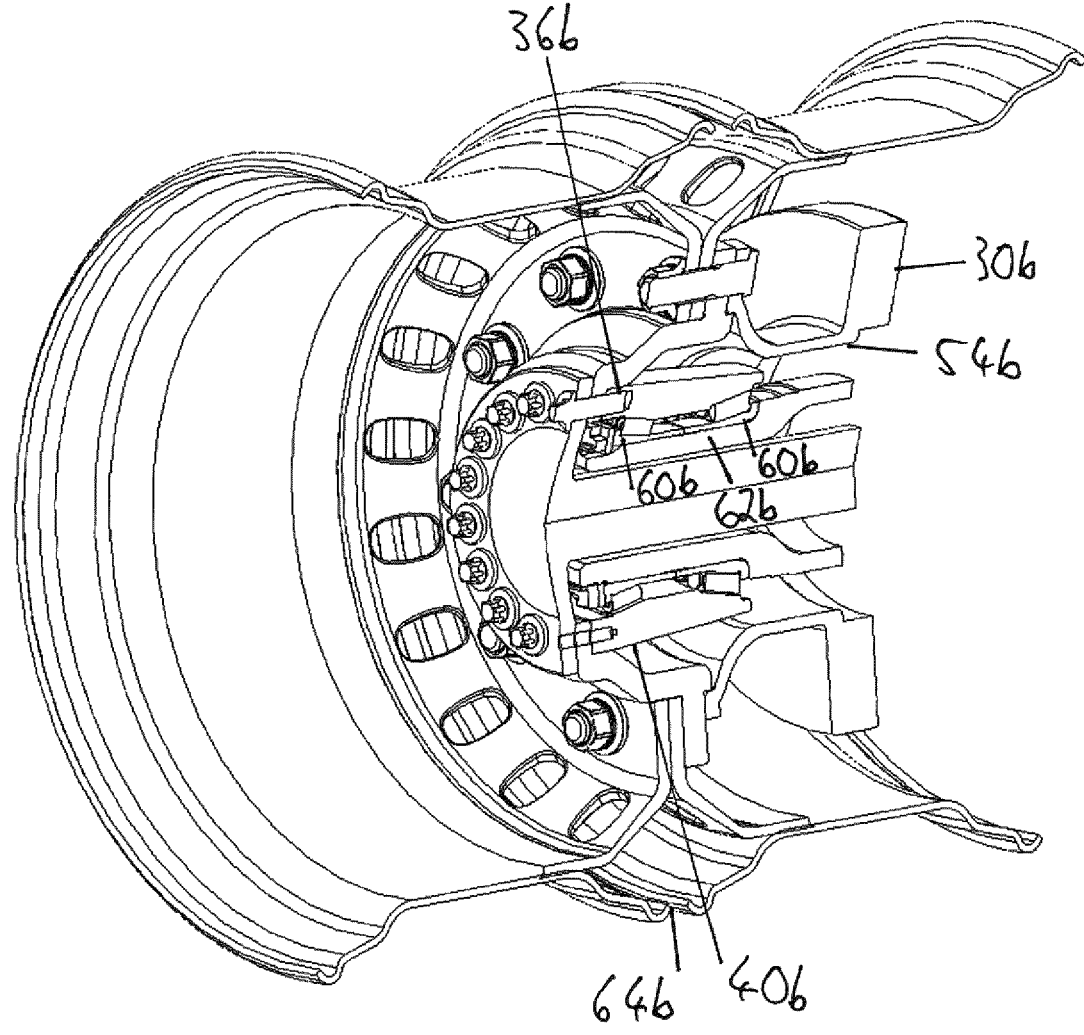
FIG. 6 shows a perspective view of a section through a third inventive wheel bearing assembly, wherein an outer ring and the wheel flange is configured particularly low-weight.
Figure 7:
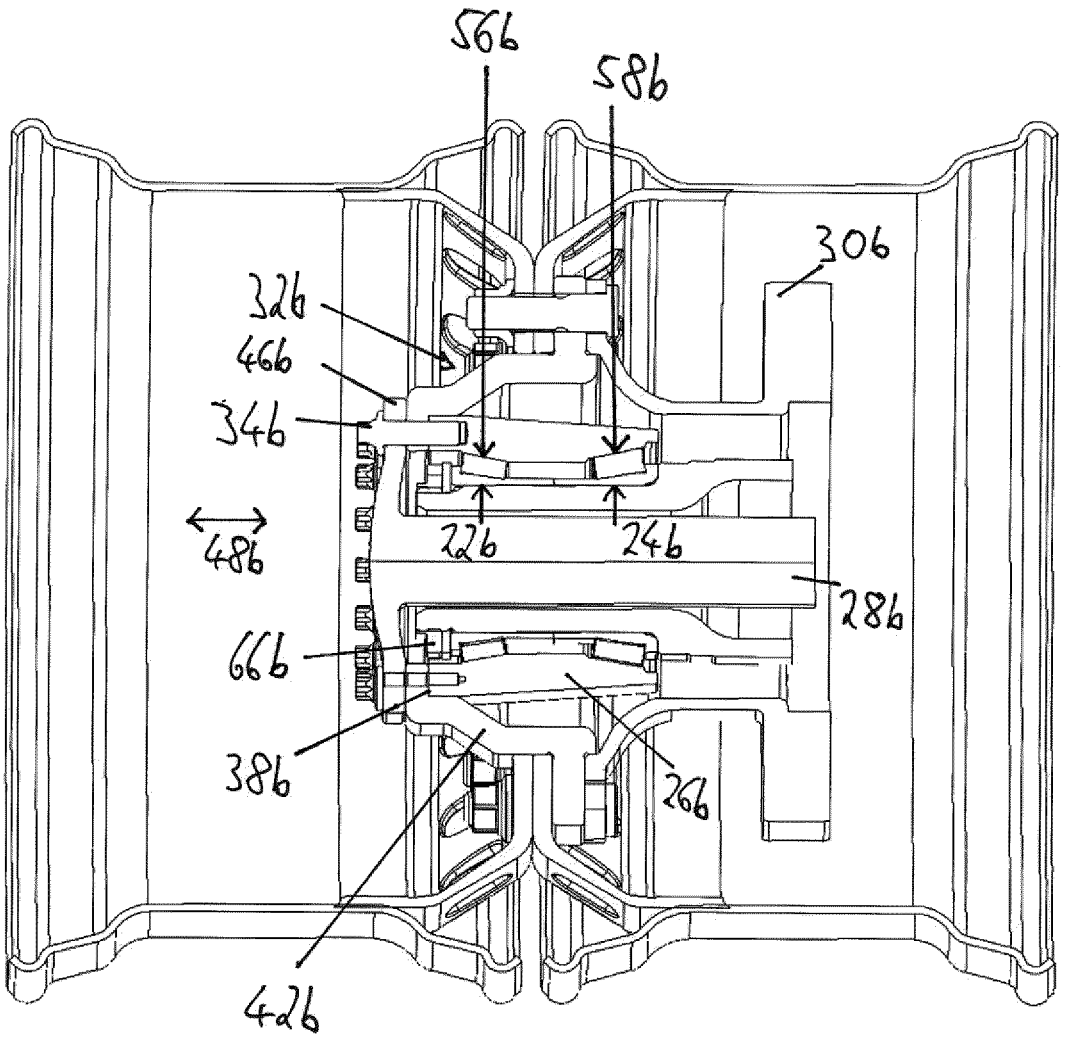
FIG. 7 shows an axial section through the last-mentioned wheel bearing assembly.

In FIGS. 6 and 7, a further alternative exemplary embodiment of a wheel bearing assembly is depicted. With respect to its shape, a radial outer surface of the bearing ring 26b is more than 80% an outer surface of a truncated cone. Rolling-element bearings 22b, 24b of the wheel bearing assembly are tapered roller bearings. Here tapered roller rows 56b, 58b of the rolling-element bearings are differently sized.

Figure 8:
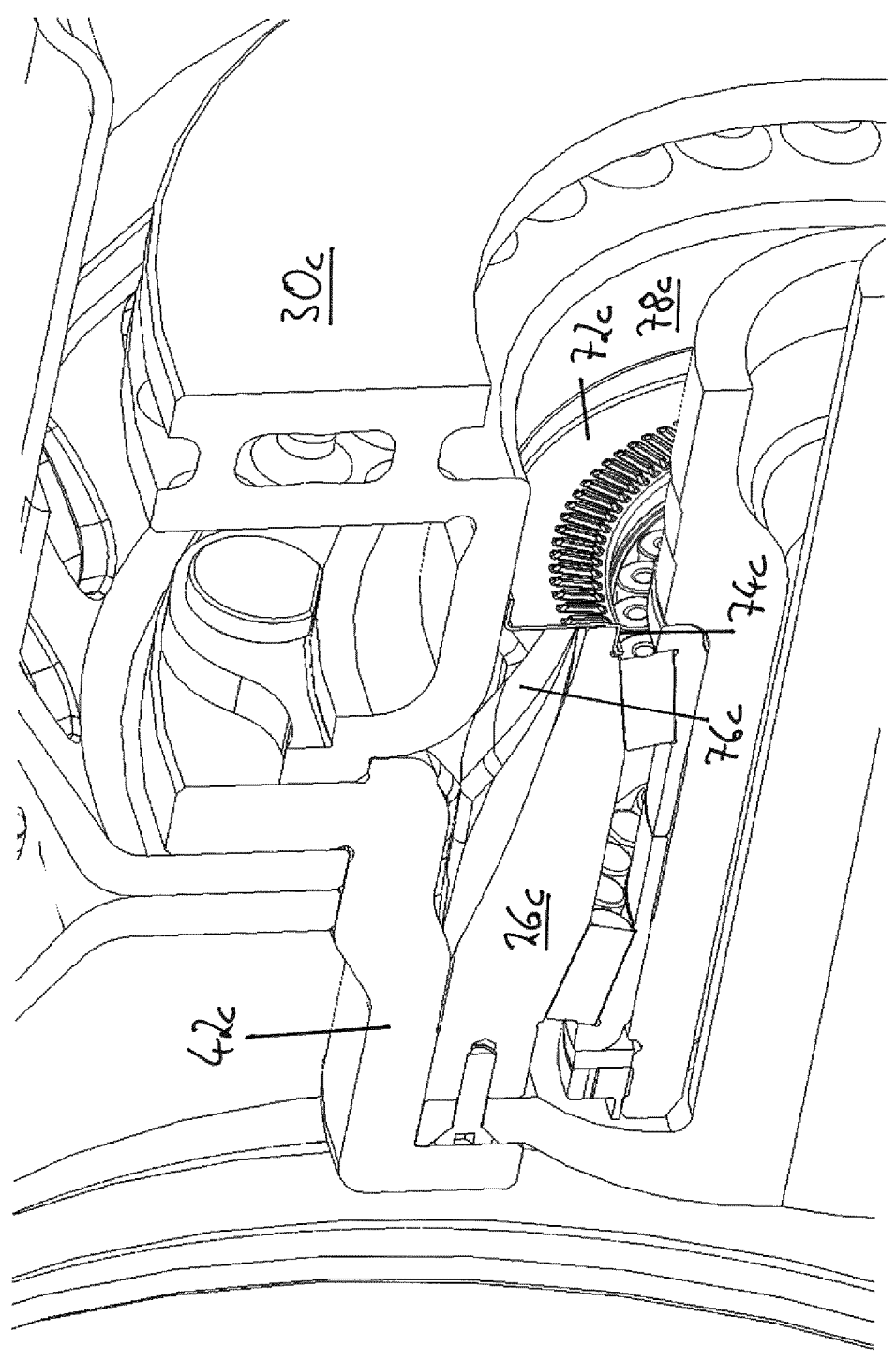
FIG. 8 shows a perspective view of a section through a further inventive wheel bearing assembly including an ABS ring.
Figure 9:
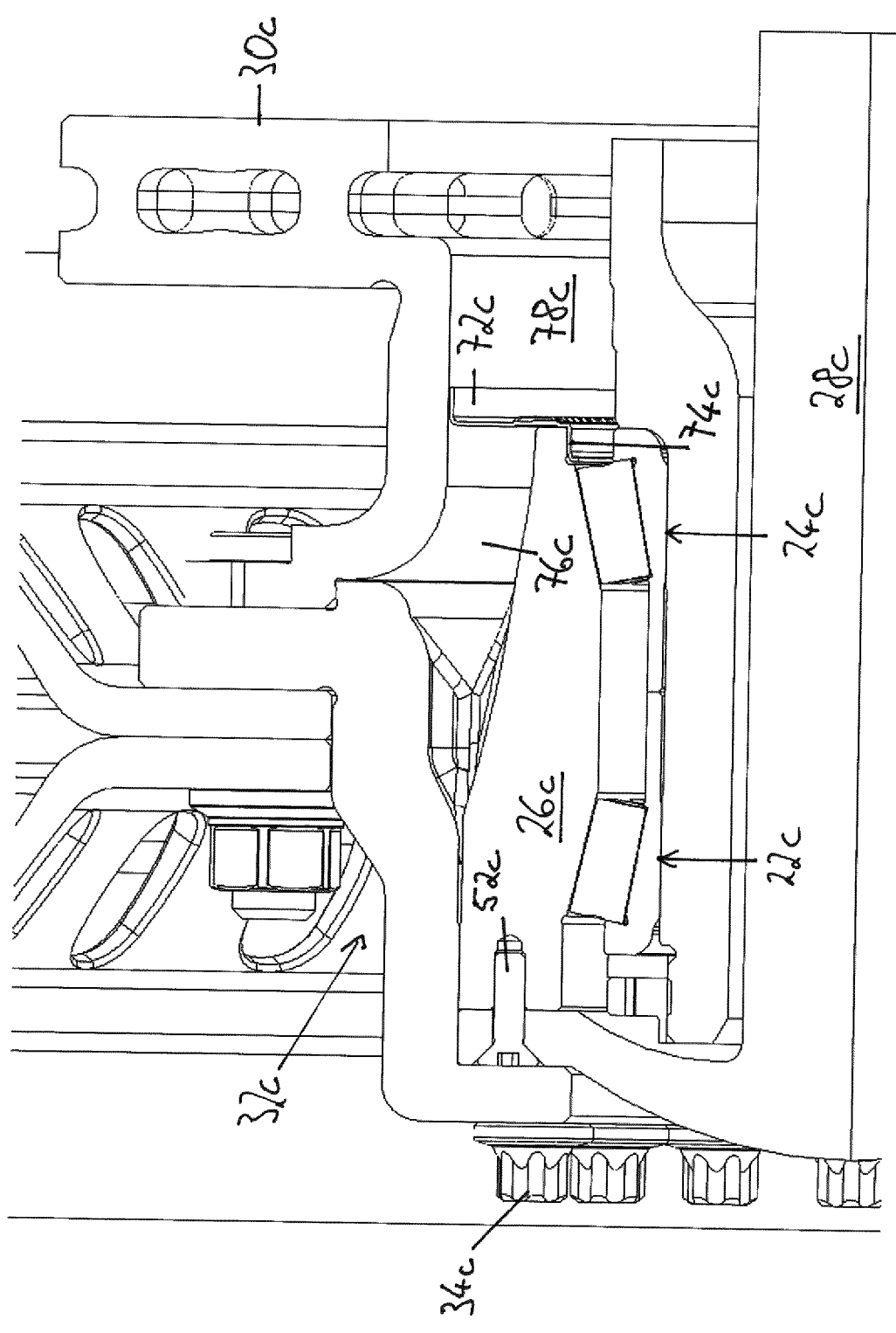
FIG. 9 shows an axial section through the last-mentioned wheel bearing assembly.
Figure 14:
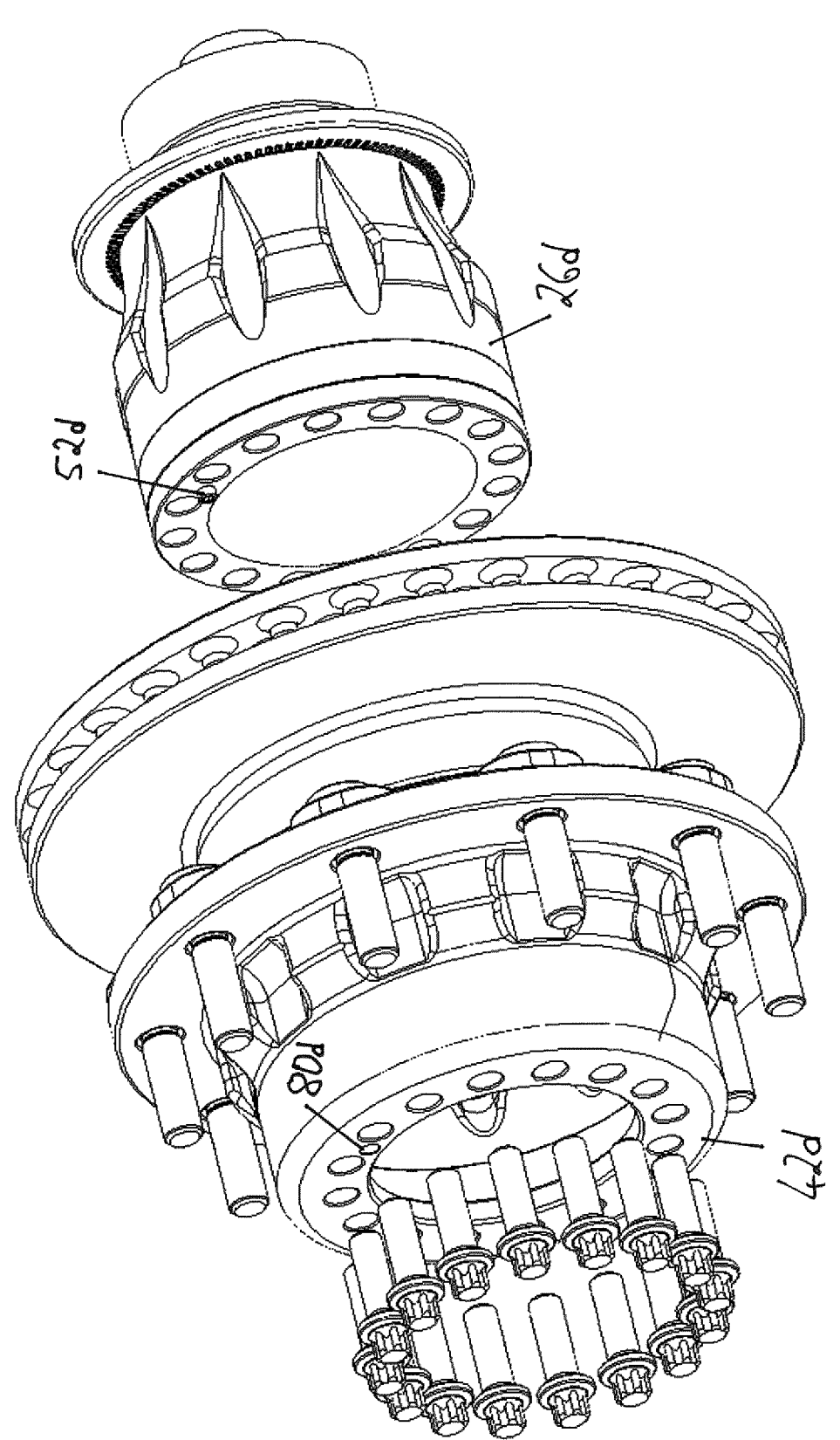
FIG. 14 shows an exploded view of a further alternative embodiment, wherein a screw protrudes axially at a flange of a drive shaft.

Alternative exemplary embodiments are depicted in FIGS. 8, 9 and 14. Essentially identical components, features, and functions are generally numbered with the same reference numbers. However, to differentiate these exemplary embodiments the letters "c" or "d" are added to the reference numbers of the exemplary embodiment of FIGS. 8, 9 and 14. The following description is essentially limited to the differences to the exemplary embodiment in FIGS. 4 and 5, wherein with respect to components, features, and functions remaining the same, reference can be made to the description of the exemplary embodiment in FIGS. 4 and 5.

FIGS. 8 and 9 show a further exemplary embodiment of an inventive wheel bearing assembly. The wheel bearing assembly includes a component 72c that is connected to the brake element 30c and the bearing ring 26c. More precisely, the component 72c is directly adjacent to the brake element and connected to the bearing ring. The component 72c is an ABS ring which has elevations arranged adjacent in the circumferential direction and extending in the axial direction, which elevations are used by a sensor (not shown) to measure a rotational speed of the bearing ring 26c. The component 72c is closely spaced from the brake element and attached to the bearing ring 26c in the axial direction in a friction-fit and interference-fit manner. For the last-mentioned attachment, a leg 74c of the component 72c, which leg 74c extends in the axial direction, abuts against a radially inner side of the bearing ring 26c. With respect to a spatial region 76c between the bearing ring 26c and the brake element 30c, the component 72c has a shielding effect with respect to a space region 78c, which is axially spaced from the bearing ring 26c and is disposed further inboard-side than the bearing ring 26c. Thus the component 72c is also a seal element.

In one alternative design of FIG. 14, a screw 52d protrudes axially, wherein at the same time an opening 80d is provided in a hub element 42d, into which opening 80d a protruding part of the screw 52d precisely fits. Due to this design of the screw and of the opening, it can be achieved that the bearing ring 26d and the hub element are installable in only a single orientation relative to each other, so that the screw and the opening form a positioning unit and an installation securing device.

REFERENCE NUMBER LIST

10 Hub element
12 Tapered roller bearing
14 Tapered roller bearing
20 Region
22 Rolling-element bearing
24 Rolling-element bearing
26 Bearing ring
28 Drive shaft
30 Brake element
32 Connecting unit
34 Screws
36 Openings
37 Openings
38 End side
40 Outer side
42 Hub element
44 Inner side
46 Flange
48 Axial direction
50 Attachment region
52 Screw
54 Through-hole
56 Tapered roller row
58 Tapered roller row
60 Inner ring
62 Axle section
64 Rim
66 Nut
68 Elevation
70 Elevation
72 Component
74 Leg
76 Spatial region
78 Spatial region
80 Opening

The invention claimed is:

1. A wheel bearing assembly for at least one wheel, the wheel bearing assembly comprising:
   at least two rolling-element bearings configured to jointly participate in supporting the at least one wheel, at least one of the rolling-element bearings including a bearing ring for transmitting propulsion and attached to a drive shaft;
   a brake element immovable relative to the bearing ring during use of the wheel bearing assembly;
   a connecting unit connecting the brake element to the bearing ring, the connecting unit being removable from the bearing ring such that the brake element is removable from the rolling-element bearings and is displaceable to any distance from the bearing ring without removal of the rolling element bearings from the wheel bearing assembly; and
   at least one seal element that shields a spatial region radially between the bearing ring and the brake element.

2. The wheel bearing assembly according to claim 1, wherein the drive shaft is connected to the bearing ring by screws which are screwed into openings on a first end side of the bearing ring.

3. The wheel bearing assembly according to claim 1, wherein the bearing ring is formed without a shoulder on an axially outer side of the bearing ring, the axially outer side of the bearing ring receiving screws for attaching the drive shaft and/or a hub element of the wheel bearing assembly to the bearing ring.

4. The wheel bearing assembly according to claim 1, wherein a hub element of the wheel bearing assembly is attached to the bearing ring by screws and/or studs.

5. The wheel bearing assembly according to claim 4, wherein the brake element is fixedly screwed to the hub element.

6. The wheel bearing assembly according to claim 4, wherein the hub element is supported on the bearing ring over more than 30% of its maximum axial length on its radial inner side.

7. The wheel bearing assembly according to claim 4, wherein the drive shaft has a flange, which in the axial direction of the wheel bearing assembly is disposed at least partially between an attachment region of the hub element and an end side of the bearing ring, using which the hub element is attached to the bearing ring.

8. The wheel bearing assembly according to claim 4, further comprising at least one positioning unit configured to position the hub element relative to the bearing ring in a certain position with respect to a circumferential direction of the bearing ring.

9. The wheel bearing assembly according to claim 4, further comprising at least one screw which at least contributes to attaching the drive shaft to the bearing ring and which is free from a region that penetrates the hub element.

10. The wheel bearing assembly according to claim 1, further comprising at least one installation securing device configured to establish a certain orientation or one of a certain number of certain orientations of a hub element relative to the bearing ring in the circumferential direction to achieve a maximally stable connection between the hub element of the wheel bearing assembly and the bearing ring, wherein the certain number is less than six.

11. The wheel bearing assembly according to claim 1, wherein the drive shaft has a flange and in a completely uninstalled state, in which neither the brake element nor the flange is connected to any other component, the flange of the drive shaft is completely movable through a through-hole of the brake element.

12. A truck including a wheel bearing assembly according to claim 1 and the drive shaft.

13. A method for removing a brake element of a wheel bearing assembly according to claim 1, wherein the bearing ring is configured as an outer ring, the brake element has a through-hole, the brake element and the bearing ring are movable relative to each other and the outer ring is displaceable through the through-hole of the brake element.

14. The method according to claim 13, wherein a flange of the drive shaft remains attached to the bearing ring while relative movement occurs between the brake element and the bearing ring.

15. A method for installing a brake element of a wheel bearing assembly according to claim 1, wherein the brake element is attached to a connecting unit and the connecting unit is attached to the bearing ring by screws, wherein with respect to its circumferential direction the connecting unit is brought into such an orientation with respect to the bearing ring that a number of screws, using which the connecting unit can be attached to the bearing ring, is greater than in other orientations of the connecting unit relative to the bearing ring with respect to the circumferential direction, in which the connecting unit is also screwable to the bearing ring.

16. A kit for assembling a wheel bearing assembly according to claim 1 and including a hub element, a bearing ring, and a number of attachment elements, wherein all parts of the kit can only be installed when the hub element is oriented in one of a certain number of orientations relative to the bearing ring, wherein the certain number of orientations is less than six.

\* \* \* \* \*